(12) United States Patent
Ozeki

(10) Patent No.: US 12,645,358 B2
(45) Date of Patent: Jun. 2, 2026

(54) CONTROLLER

(71) Applicant: Fanuc Corporation, Minamitsuru-gun (JP)

(72) Inventor: Shinichi Ozeki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 340 days.

(21) Appl. No.: 18/035,183

(22) PCT Filed: Nov. 17, 2021

(86) PCT No.: PCT/JP2021/042261
§ 371 (c)(1),
(2) Date: May 3, 2023

(87) PCT Pub. No.: WO2022/107818
PCT Pub. Date: May 27, 2022

(65) Prior Publication Data
US 2023/0409004 A1 Dec. 21, 2023

(30) Foreign Application Priority Data

Nov. 20, 2020 (JP) ................................. 2020-193517

(51) Int. Cl.
*G06F 3/04886* (2022.01)
*G05B 19/409* (2006.01)
*G06F 3/04817* (2022.01)

(52) U.S. Cl.
CPC ....... *G06F 3/04886* (2013.01); *G05B 19/409* (2013.01); *G06F 3/04817* (2013.01); *G05B 2219/32128* (2013.01)

(58) Field of Classification Search
CPC ....... G06F 3/04886; G06F 2203/04803; G06F 3/0482; G06F 3/0481; G05B 2219/32128; G05B 19/409
See application file for complete search history.

(56) References Cited

U.S. PATENT DOCUMENTS 4,873,623 A * 10/1989 Lane ..................... G06F 3/0482
700/83
6,166,736 A * 12/2000 Hugh ................... G06F 3/0481
715/777
(Continued)

FOREIGN PATENT DOCUMENTS

DE 10 2015 117 890 A1 4/2016
JP 2000066709 A 3/2000
(Continued)

OTHER PUBLICATIONS

Office Action (Decision to Grant a Patent) issued Jun. 11, 2024, by the Japan Patent Office in corresponding Japanese Patent Application No. 2022-563805, and an English translation of the Office Action. (5 pages).

(Continued)

*Primary Examiner* — Mong-Shune Chung
(74) *Attorney, Agent, or Firm* — BUCHANAN INGERSOLL & ROONEY PC

(57) ABSTRACT

A controller displays a display-info-type selection screen displaying, for each of a plurality of split regions due to splitting of a display screen, as a list, a first displaying and a second displaying in association, the first displaying enabling visual specification of a position of the corresponding split region on the display screen, the second displaying indicating a list of information types displayable in the split region. The controller receives a selection operation to an information type included in the second displaying, selects, based on the selection operation, the information type to be displayed in the split region, and displays, based on the selection of the information type, information according to a predetermined information type in each of the plurality of split regions.

3 Claims, 5 Drawing Sheets

(56)         References Cited

U.S. PATENT DOCUMENTS

| | | | |
|---|---|---|---|
| 8,423,185 | B2 | 4/2013 | Sakaguchi et al. |
| 2009/0064016 | A1* | 3/2009 | Li .............................. G09G 5/00 |
| | | | 715/764 |
| 2009/0150823 | A1* | 6/2009 | Orr ........................ G06F 3/0481 |
| | | | 715/788 |
| 2014/0149931 | A1* | 5/2014 | Miki ........................ G06F 9/451 |
| | | | 715/803 |
| 2014/0164991 | A1* | 6/2014 | Kim ...................... G06F 3/0486 |
| | | | 715/788 |
| 2016/0117090 | A1 | 4/2016 | Fujitsuka et al. |
| 2016/0239203 | A1* | 8/2016 | Sato ................... G06F 3/04883 |
| 2017/0146978 | A1* | 5/2017 | Kawai ................. G05B 19/402 |
| 2021/0011610 | A1* | 1/2021 | Hwang ................. G06F 3/0481 |
| 2023/0214103 | A1* | 7/2023 | Kim ...................... G06F 3/0482 |
| | | | 715/788 |

FOREIGN PATENT DOCUMENTS

| | | | |
|---|---|---|---|
| JP | 2010120095 | A | 6/2010 |
| JP | 2010-152882 | A | 7/2010 |
| JP | 2013-058219 | A | 3/2013 |
| WO | 2015194010 | A1 | 12/2015 |
| WO | 2016/189657 | A1 | 12/2016 |

OTHER PUBLICATIONS

International Search Report and Written Opinion for International Application No. PCT/JP2021/042261, dated Jan. 25, 2022, 5 pages.
Office Action (The First Office Action) issued Jul. 8, 2025, by the State Intellectual Property Office of People's Republic of China in corresponding Chinese Patent Application No. 202180075204.X and an English translation of the Office Action. (15 pages).

* cited by examiner

FIG. 4

(Sample)

```
//CNC_MEM/USER/PATH1/
O0001
G1202 H4.52 V23.57 R24. I0. J0. E24. P0. Q0. L0.
M1. U0. ;
G1201 H86.51 V7.86 K8. L0. M1. S13. ;
G1202 H85. V−8. R8. I85. J0. E8. P85. Q0. L0.
M1. U0. ;
G1201 H61.2 V−8. K5. L0. M1. ;
G1203 H26.56 V−28. R40. I61.2 J−48. E40. Q−48.
L0. M1. S13. U0. ;
G1201 H6.93 V−62. K6. A60. L0. M1. S13. ;
G1202 H−8. V−58. R8. I−. J−58. C−8. D−58. E8.
P0. Q−58. L0. M0. U0. ;
G1206 ;
G1369 ;
%
```

TURNING GROOVE

G1130
G1470

MACHINED SURFACE

PROCESS

ROUGH MACHINING METHOD

SIDE FINISHING ALLOWANCE

BOTTOM FINISHING ALLOWANCE

FEED RATE

CONTROLLER

CROSS REFERENCE TO RELATED APPLICATIONS

This is the U.S. National Phase application of PCT/JP2021/042261, filed Nov. 17, 2021, which claims priority to Japanese Patent Application No. 2020-193517, filed Nov. 20, 2020, the disclosures of these applications being incorporated herein by reference in their entireties for all purposes.

FIELD OF THE INVENTION

The present invention relates to a controller.

BACKGROUND OF THE INVENTION

In order to operate an industrial machine, such as a machine tool or a robot, for example, in order to carry out operations in setup work before processing, an operator works while checking different types of information. In order to enable a plurality of different types of information to be referred to in a single screen, in some cases, a controller for controlling an industrial machine has, for example, a function of dividing the display screen of a display device into tile-shaped split regions and displaying respective different types of information in the split regions resulting from the division (e.g., Patent Literature 1).

However, such a display device has limits on the size and the number of pixels of its display screen. Thus, in particular, in a case where an amount of information, difficult to display at a time in a single screen, requires displaying for setup work or the like, such work requires carrying out with switching of information to be displayed in each split region due to division in the screen. Such switching in display is carried out by operating, for example, a longitudinal move softkey, a lateral move softkey, or a machine operation board.

PATENT LITERATURE

Patent Literature 1: JP 2000-066709 A

SUMMARY OF THE INVENTION

As above, for display with switching of a plurality of information types to a plurality of split regions, a definition is given in advance as to what information type is displayable in each split region, and switching in display is performed in accordance with the definition. However, for example, switching with a longitudinal move softkey, a lateral move softkey, or a machine operation board makes a grasp difficult as to what information type is to be displayed to which split region, leading to, as a problem, time-consuming switching to a desired display. Setup work or the like is often carried out with comparisons between a plurality of information types. Thus, for display of respective desired information types in a plurality of split regions, trial-and-error switching operations are required.

In order to solve such problems, required is a means for enabling an operation with an entire grasp as to what information type is displayable by switching in each split region.

A controller according to the present invention enables a display screen to be split into a plurality of split regions and display of a different information type to each split region and provides a user interface screen enabling selection of an information type to be displayed to each split region. On the screen, the position of each split region on the display screen and a list of information types displayable in the corresponding split region are displayed in combination. In the display, selection of an information type to be displayed in a predetermined split region switches the display in the split region to the selected information type. Thus, an operator can grasp, at a glance, an information type displayable in each split region and easily select a desired display mode.

According to one aspect of the present invention, provided is a controller enabling a display screen to be split into a plurality of split regions, a display-info-type selection-screen display unit configured to display a display-info-type selection screen displaying, for each of the plurality of split regions, as a list, a first displaying and a second displaying in association, the first displaying enabling visual specification of a position of the corresponding split region on the display screen, the second displaying indicating a list of information types displayable in the split region; a display-info-type selection unit configured to receive a selection operation to an information type included in the second displaying, the display-info-type selection unit being configured to select, based on the selection operation, the information type to be displayed in the split region; and a display control unit configured to display, based on the selection of the information type in the display-info-type selection unit, information according to a predetermined information type in each of the plurality of split regions.

According to the one aspect of the present invention, information types displayable in each split region can be displayed as a list and furthermore an information type to be displayed in each split region can be freely selected, leading to an improvement in visibility to an operator, a reduction in the burden of the operator in work, and a reduction in operating time.

BRIEF DESCRIPTION OF DRAWINGS

FIG. 4 illustrates another exemplary display-info-type selection screen.

DETAILED DESCRIPTION OF EMBODIMENTS OF THE INVENTION

An embodiment of the present invention will be described below with the drawings.

Figure 1:
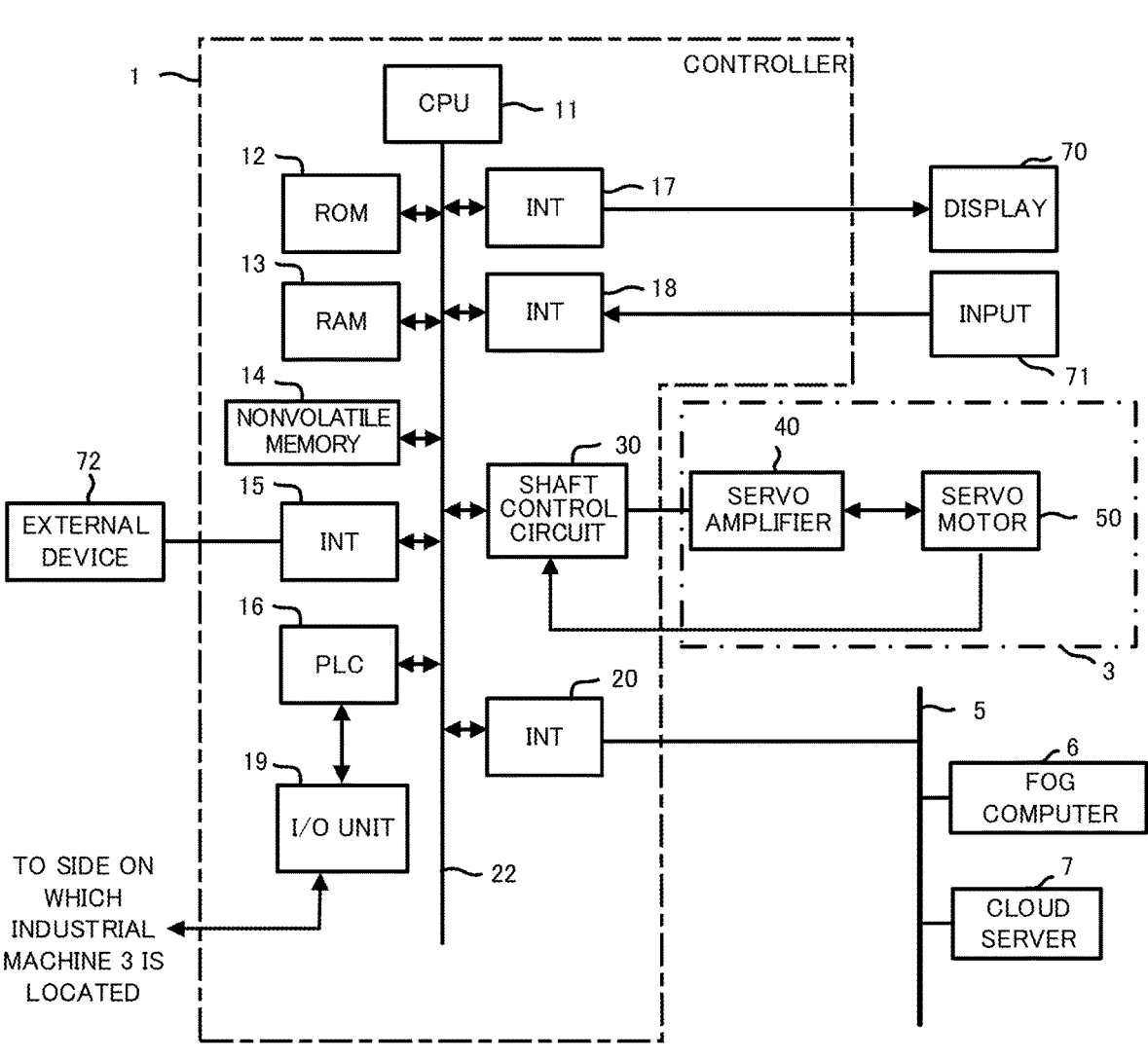
FIG. 1 illustrates a schematic hardware configuration of a controller according to a first embodiment.

FIG. 1 illustrates a schematic hardware configuration of main parts of a controller according to a first embodiment of the present invention. The controller 1 according to the present invention can be implemented, for example, as a controller configured to control an industrial machine 3, based on a control program.

A CPU 11 included in the controller 1 according to the present embodiment serves as a processor that controls the entirety of the controller 1. The CPU 11 reads a system program stored in a ROM 12 through a bus 22 and controls the entirety of the controller 1 in accordance with the system program. A RAM 13 temporarily stores, for example, temporary calculation data and display data, and various types of data that are input from outside.

A nonvolatile memory 14 is achieved, for example, with a memory or solid state drive (SSD) backed up by a battery (not shown) and retains its memory state even when the power of the controller 1 is turned off. The nonvolatile memory 14 stores, for example, a control program and data that are read from an external device 72 through an interface 15, a control program and data input from an input device 71 through an interface 18, and a control program and data acquired from a different device, such as a fog computer 6 or a cloud server 7, through a network 5. Data to be stored in the nonvolatile memory 14 may include, for example, data according to the position, rate, acceleration, and load of each motor included in the industrial machine 3 and respective physical quantities detected by sensors, not shown, attached to the industrial machine 3. The control program and data stored in the nonvolatile memory 14 may be developed on the RAM 13 at the time of execution or utilization. The ROM 12 has various types of system programs, such as a publicly known analysis program, written therein in advance.

The interface 15 serves as an interface for connecting the CPU 11 in the controller 1 and the external device 72, such as an external storage medium. For example, a control program and setting data for use in control of the industrial machine 3 is read from the side on which the external device 72 is located. For example, the control program and setting data edited in the controller 1 can be stored in an external storage medium (not shown), such as a CF card or a USB memory, through the external device 72. A programmable logic controller (PLC) 16 executes a ladder program to output, through an I/O unit 19, signals to the industrial machine 3 and peripheral devices of the industrial machine 3 (e.g., a tool exchanger, an actuator, such as a robot, and sensors, such as a temperature sensor and a humidity sensor, attached to the industrial machine 3), resulting in control. The PLC 16 receives, for example, signals from various types of switches on an operation board with which the body of the industrial machine 3 is provided and signals from peripheral devices and performs signal processing necessary to the signals. Then, the PLC 16 sends, to the CPU 11, the signals subjected to the signal processing.

An interface 20 serves as an interface for connecting the CPU in the controller 1 and the network 5 that is wired or wireless. The network 5 may achieve communication with a technology, such as serial communication, for example, based on RS-485, Ethernet (registered trademark) communication, optical communication, a wireless LAN, Wi-Fi (registered trademark), or Bluetooth (registered trademark). Other machines and higher-level management devices, such as the fog computer 6 and the cloud server 7, are connected to the network 5, enabling mutual data exchange with the controller 1.

A display device 70 displays, for example, each piece of data read onto a memory and data acquired as a result of execution of a program, which are output through an interface 17. Desirably, the display 70 is allowed to acquire information according to its display performance (e.g., display size and the number of pixels) from the controller 1. The acquired information according to the display performance may be sequentially acquired or may be stored in the RAM 13 or the nonvolatile memory 14, similarly to other information. The input 71 including, for example, a keyboard and a pointing device sends a command and data based on an operation by a worker through the interface 18 to the CPU 11.

A shaft control circuit 30 configured to control a shaft included in the industrial machine 3 receives a command for the amount of movement of the shaft from the CPU 11 and outputs a command for the shaft to a servo amplifier 40. When receiving the command, the servo amplifier 40 drives a servo motor 50 for moving, along the shaft, a drive unit included in the industrial machine 3. The servo motor 50 for the shaft has a built-in position/rate detector and feeds back a position/rate feedback signal from the position/rate detector to the shaft control circuit 30, leading to position/rate feedback control. Note that, referring to the hardware configuration illustrated in FIG. 1, the shaft control circuit 30, the servo amplifier 40, and the servo motor 50 are each one in number. However, in practice, provided are shaft control circuits 30, servo amplifiers 40, and servo motors 50 of which the numbers are identical to the number of shafts to be controlled included in the industrial machine 3.

Figure 2:
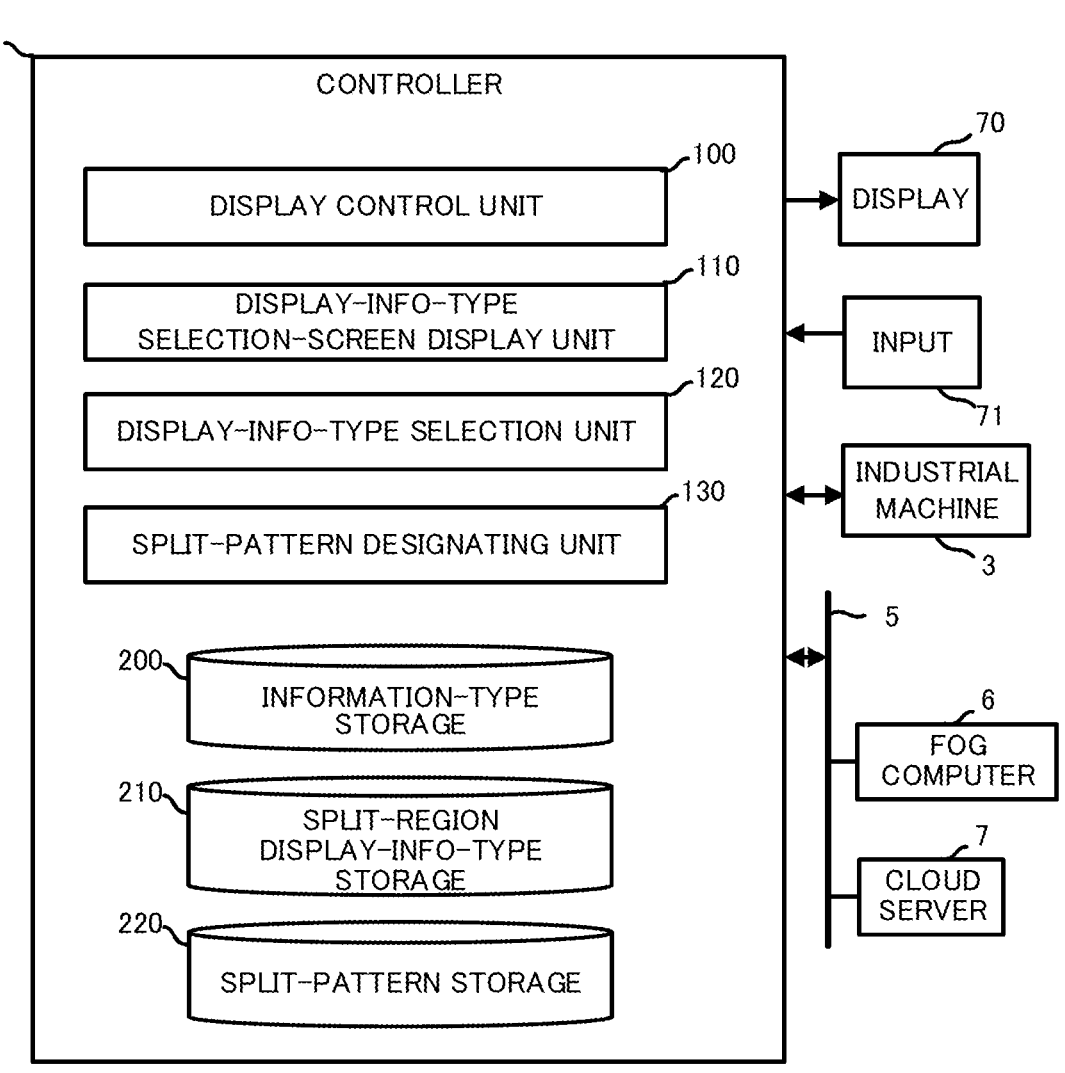
FIG. 2 is a schematic block diagram of functions of the controller according to the first embodiment.

FIG. 2 is a schematic block diagram of functions included in the controller 1 according to the first embodiment of the present invention. The CPU 11 included in the controller 1 shown in FIG. 1 executes a system program to control the operation of each part of the controller 1, leading to achievement of each function included in the controller 1 according to the present embodiment.

The controller 1 according to the present embodiment includes a display control unit 100, a display-info-type selection-screen display unit 110, a display-info-type selection unit 120, and a split-pattern designating unit 130. The RAM 13 and the nonvolatile memory 14 in the controller 1 is provided with an information-type storage 200 that stores at least information for identifying an information type displayable by the controller 1 (e.g., the name of the information type and a pointer to a display program for displaying information according to the information type), a split-region display-info-type storage 210 serving as an area in which an information type displayable due to allocation to each split region is stored in association with the corresponding split region, and a split-pattern storage 220 serving as an area in which a split pattern indicating how to split the display screen of the display 70 is stored in advance.

The CPU 11 included in the controller 1 illustrated in FIG. 1 executes the system program read from the ROM 12 to perform mainly arithmetic processing with the RAM 13 and the nonvolatile memory 14 and display output processing with the interface 17, resulting in achievement of the display control unit 100. The display control unit 100 splits the display screen of the display 70 into a plurality of split regions and displays information according to a designated information type in each split region. At the time of display of information according to an information type, the display control unit 100 invokes a display program corresponding to the information type to be displayed, with reference to the information-type storage 200. The display control unit 100 usually treats the display screen of the display 70 as a single display region and displays information according to a predetermined information type determined by an operation from an operator to the display region. When the split-pattern designating unit 130 designates splitting to the display screen, the display control unit 100 splits the display screen into a plurality of split regions, based on the designated split pattern. Then, the unit 100 displays, in each split region, information according to a predetermined information type stored in the split-region display-info-type storage 210.

The CPU 11 included in the controller 1 shown in FIG. 1 executes the system program read from the ROM 12 to perform mainly arithmetic processing with the RAM 13 and the nonvolatile memory 14 and display output processing through the interface 17, resulting in achievement of the display-info-type selection-screen display unit 110. The display-info-type selection-screen display unit 110 displays a display-info-type selection screen on the display screen of the display device 70.

Figure 3:
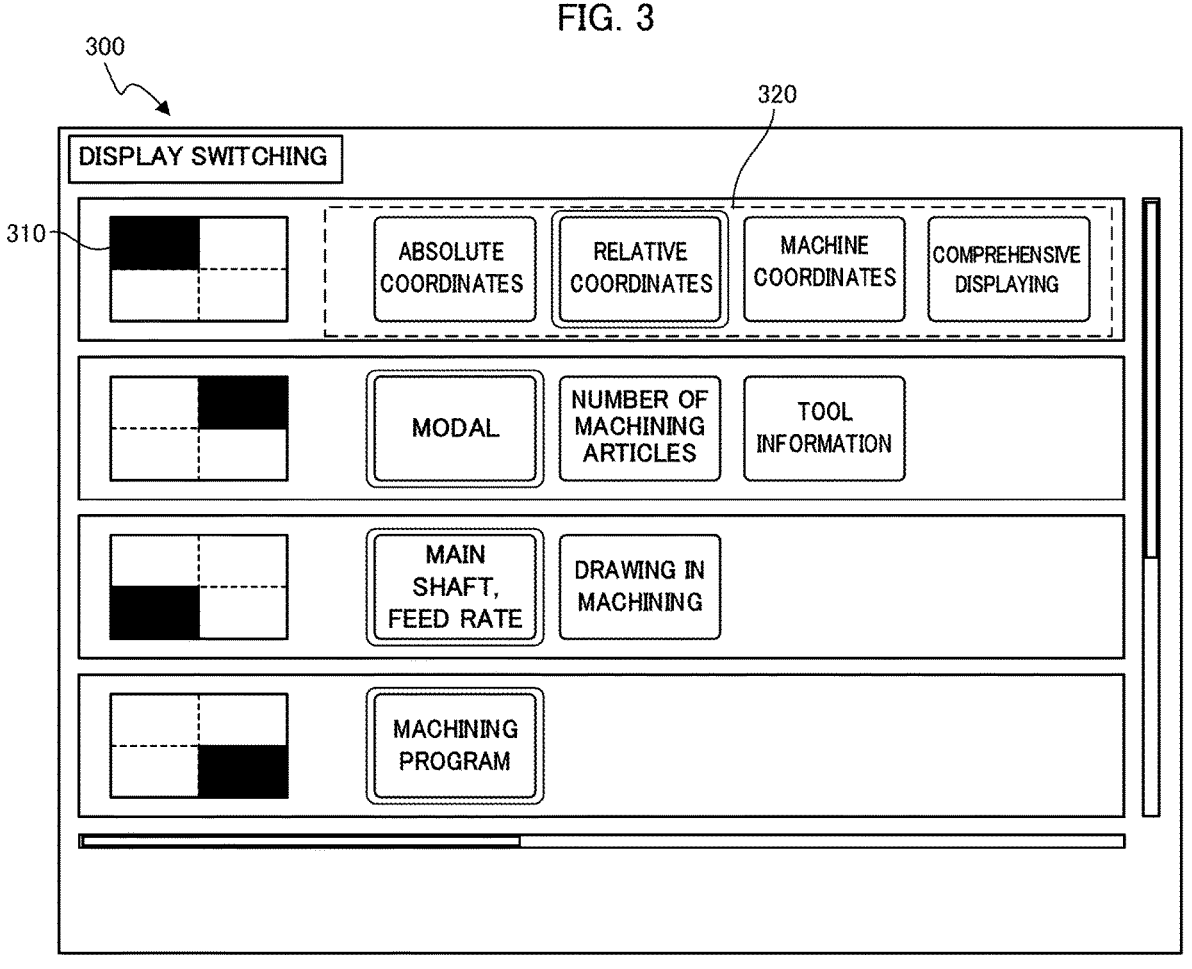
FIG. 3 illustrates an exemplary display-info-type selection screen.

FIG. 3 illustrates an exemplary display-info-type selection screen. In the example of FIG. 3, given is an exemplary split pattern in which the display screen is split into four split regions for display by left-and-right two-way splitting and up-and-down two-way splitting.

The display-info-type selection screen 300 includes at least a first displaying 310 enabling visual specification of the position of each split region on the display screen. The first displaying 310 may further enable visual specification of the size of each split region on the display screen. In the example of FIG. 3, the first displaying 310 is given in an icon format in which the entire display screen is split with parting lines (dotted lines) and the position of a split region on the display screen is black.

The display-info-type selection screen 300 includes at least a second displaying 320 indicating a list of information types displayable in each split region. The second displaying 320 may be highlighted in display such that the information type currently displayed in the corresponding split region can be grasped. The second displaying 320 may be highlighted in display such that the latest selected information type to be displayed in the split region can be grasped. In the example of FIG. 3, the second displaying 320 is given in an icon format in which the name of an information type is displayed.

As shown in FIG. 3, icons highlighted in display with double frames indicate that information according to the information type "relative coordinates" is displayed in the upper left split region, information according to the information type "modal" is displayed in the upper right split region, information according to the information type "main shaft, feed rate" is displayed in the lower left split region, and information according to the information type "machining program" is displayed in the lower right split region. The first displaying 310 and the second displaying 320 identical in split region are displayed such that the correspondence relationship therebetween can be grasped. The first displaying 310 and the second displaying 320 are displayed based on the correspondence relationship between each split region and an information type allocated to the corresponding split region, stored in the split-region display-info-type storage 210. In the example in FIG. 3, for example, the first displaying 310 and the second displaying 320 identical in split region are displayed side by side in the same row. In this example, in the upper left split region, the information types "absolute coordinates", "relative coordinates", "machine coordinates", and "comprehensive display" are displayable. Such a display-info-type selection screen as above enables a grasp at a glance as to what information type is displayable in which split region.

The CPU 11 included in the controller 1 shown in FIG. 1 executes the system program read from the ROM 12 to perform mainly arithmetic processing with the RAM 13 and the nonvolatile memory 14 and input/output processing through the interfaces 17 and 18, resulting in achievement of the display-info-type selection unit 120. The display-info-type selection unit 120 receives a selection operation to the second displaying 320 and determines, as a list, an information type to be displayed in each split region, based on the selection operation.

On the display-info-type selection screen 300 exemplified in FIG. 3, each information type included in the second displaying 320 is alternatively selectable in the same second displaying 320, for example, like a radio button. When the operator operates a mouse or the like to select an information type included in the second displaying 320, the display-info-type selection unit 120 brings the information type selected by the operator into highlighted display and brings the information type originally highlighted in display into normal display. Then, the display-info-type selection unit 120 commands the display control unit 100 to display, in the split region corresponding to the second displaying given the selection operation by the operator, the information type selected by the selection operation. In a case where the split pattern to which the split region corresponding to the second displaying given the selection operation by the operator belongs is different from the currently displayed split pattern, the display-info-type selection unit 120 commands the split-pattern designating unit 130 to make a change to the split pattern to which the selected split region belongs.

The CPU 11 included in the controller 1 illustrated in FIG. 1 executes the system program read from the ROM 12 to perform mainly arithmetic processing with the RAM 13 and the nonvolatile memory 14, resulting in achievement of the split-pattern designating unit 130. Based on a command from the display-info-type selection unit 120, the split-pattern designating unit 130 designates a split pattern indicating how to split the display screen of the display device 70.

Figure 4:
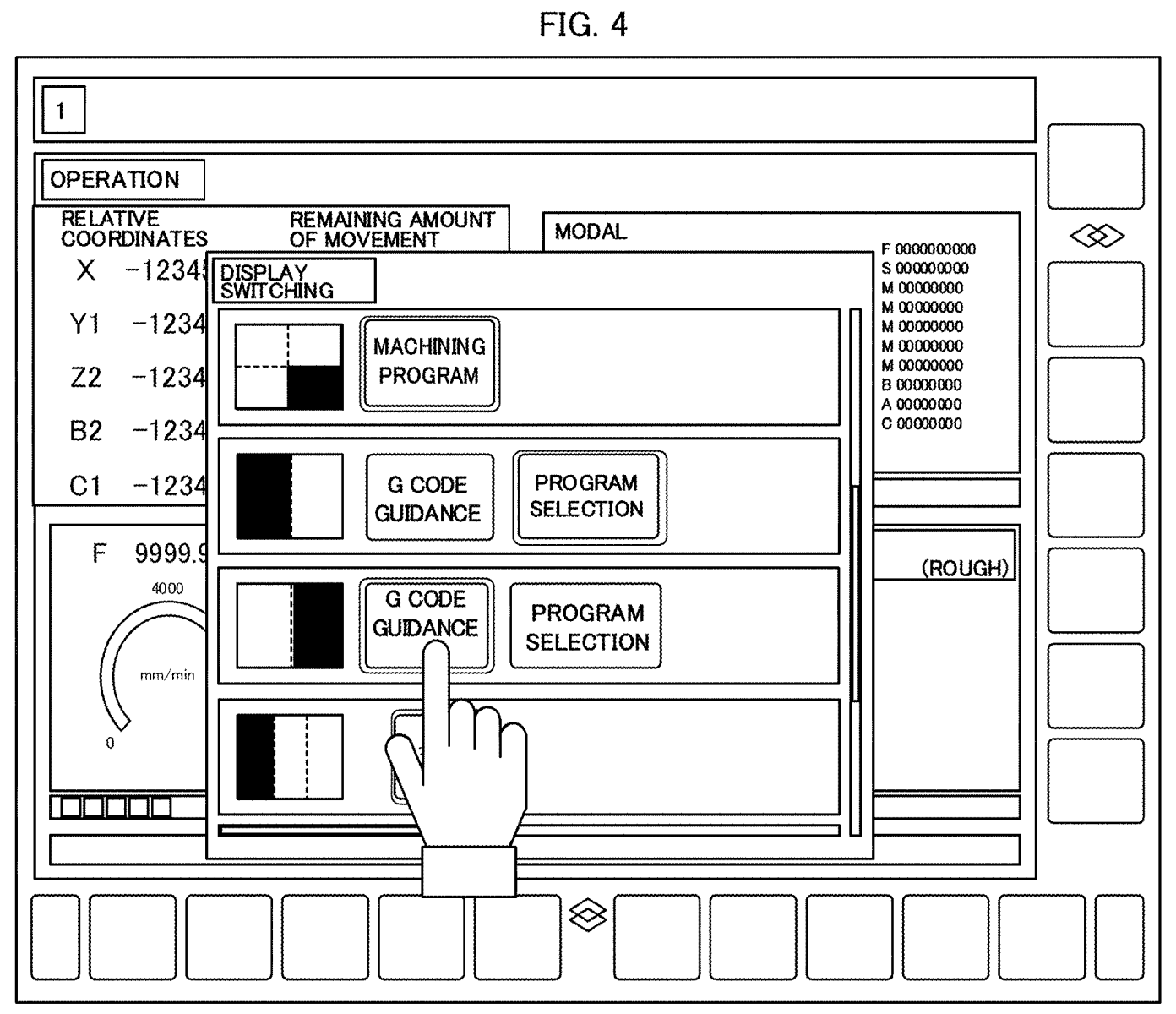
Figure 5:
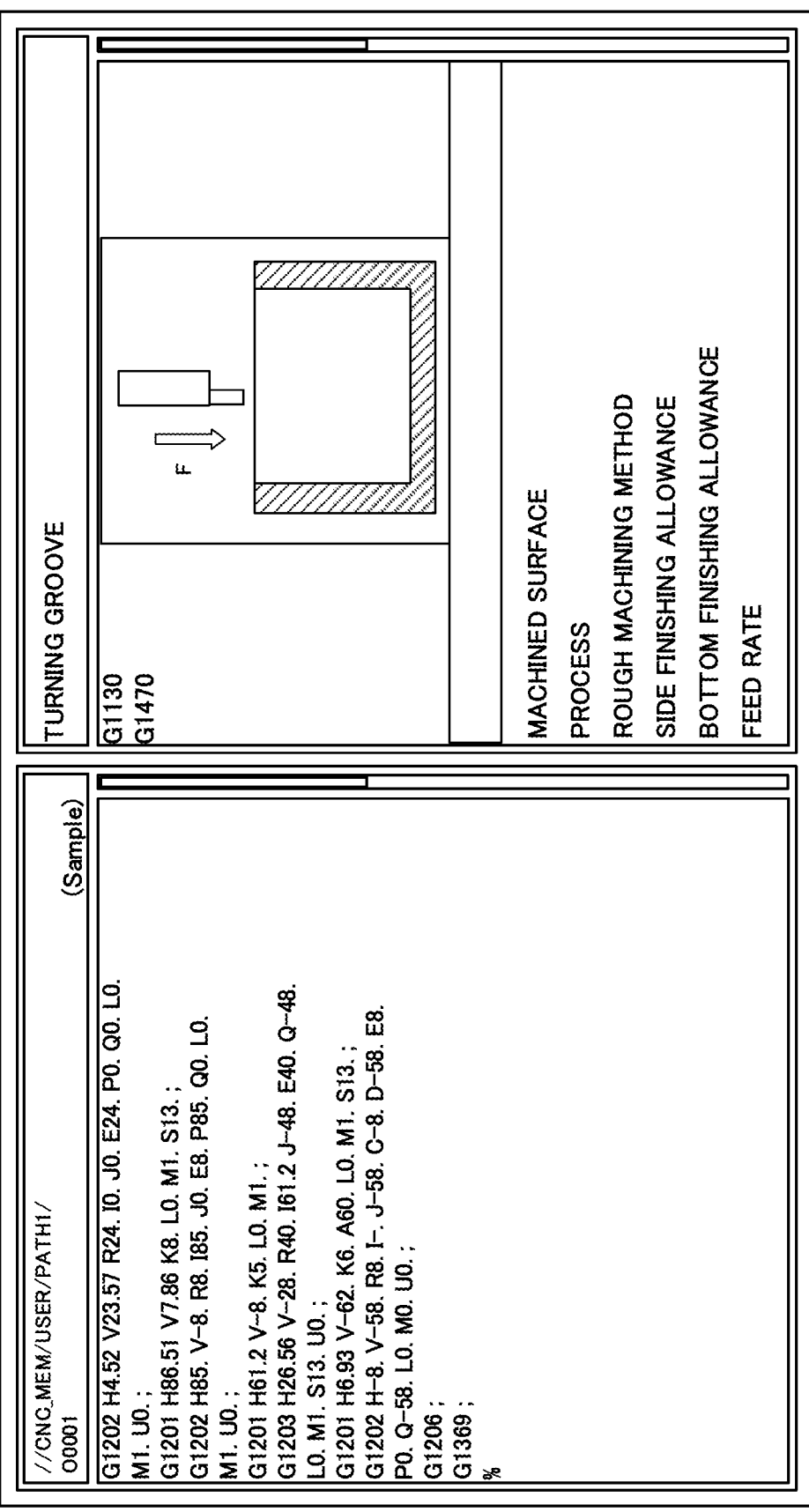
FIG. 5 illustrates an exemplary left-and-right two-way display screen.

FIG. 4 illustrates an exemplary display-info-type selection screen including a first displaying and a second displaying corresponding to a plurality of split patterns. As exemplified in FIG. 4, with the display screen displayed based on a split pattern resulting from left-and-right two-way splitting and up-and-down two-way splitting, the display-info-type selection screen is displayed. In this case, in response to selection of an information type to be displayed in a split region belonging to a left-and-right two-way split pattern different from the currently displayed split pattern from the display-info-type selection screen, the display-info-type selection unit 120 commands the split-pattern designating unit 130 to make a change into display with the left-and-right two-way split pattern. In response to the command, the split-pattern designating unit 130 reads a designated split pattern from the split-pattern storage 220. Then, the designating unit 130 commands the display control unit 100 to perform display with the read split pattern. In response to the command, as exemplified in FIG. 5, the display control unit 100 makes a switch into display changed in split pattern.

The controller 1 having the above configuration enables display of a list of information types displayable in each split region and free selection of an information type to be displayed in each split region, leading to an improvement in visibility to the operator, a reduction in the burden of the operator in work, and a reduction in operating time. In particular, the position of each split region on the display screen and an information type to be displayed in each split region can be grasped at a glance. Thus, in a case where a lot of information is displayed while being switched for setup work or the like and situationally a plurality of information types mutually relevant requires side-by-side displaying, the relationship between the position of a split region enabling efficient work and an information type displayable can be arranged.

The embodiment of the present invention has been described above. However, the present invention is not limited to the examples in the embodiment described above. Thus, the present invention can be achieved in various aspects with appropriate alterations.

REFERENCE SIGNS LIST

1 Controller
3 Industrial machine
5 Network
6 Fog computer
7 Cloud server
11 CPU
12 ROM
13 RAM
14 Nonvolatile memory
15, 17, 18, 20 Interface
16 PLC
19 I/O unit
22 Bus
30 Shaft control circuit
40 Servo amplifier
50 Servo motor
70 Display
71 Input
72 External device
100 Display control unit
110 Display-info-type selection-screen display unit
120 Display-info-type selection unit
130 Split-pattern designating unit
200 Information-type storage
210 Split-region display-info-type storage
220 Split-pattern storage

The invention claimed is:

1. A controller enabling a display screen to be split into a plurality of split regions, the controller comprising a processor configured to:

display a display-info-type selection screen displaying, for each of the plurality of split regions, as a list, a first displaying and a second displaying in association, the first displaying enabling visual specification of a position of the corresponding split region on the display screen, the second displaying indicating a list of information types displayable in the split region;

receive a selection operation by an operator to an information type included in the second displaying, designate a split pattern to the display screen and select the information type to be displayed in the split region, based on the selection operation; and split the display screen into a plurality of split regions and display information according to a predetermined information type in each of the plurality of split regions, based on the designation of the split pattern and the selection of the information type, wherein the information type included in the second displaying is alternatively selectable in the second displaying, and in response to the split pattern belonging to the split region corresponding to the second displaying including the information type selected by the operator being different from a split pattern currently displayed, change the designated split pattern of the display screen to the split pattern that the split region on the operator's selection belongs to.

2. The controller according to claim 1, wherein the first displaying serves as an icon display indicating the position of the split region on the display screen.

3. The controller according to claim 1, wherein the second displaying has a highlighted display for a grasp of the information type displayed in the split region by the processor.

\* \* \* \* \*